United States Patent [19]

Van Klompenburg

[11] 4,136,578
[45] Jan. 30, 1979

[54] CLOSURE OPERATOR

[75] Inventor: Marlo G. Van Klompenburg, Owatonna, Minn.

[73] Assignee: Truth Incorporated, Owatonna, Minn.

[21] Appl. No.: 769,578

[22] Filed: Feb. 17, 1977

[51] Int. Cl.² ............................................. G05G 1/04
[52] U.S. Cl. ...................... 74/520; 49/345; 292/DIG. 12
[58] Field of Search ............ 49/345; 74/491, 520, 74/524, 526; 292/DIG. 12; 296/137 B

[56] References Cited

U.S. PATENT DOCUMENTS

| 2,124,258 | 7/1938 | Moecker | 74/520 X |
| 3,490,309 | 1/1970 | Gustavson | 74/520 |
| 3,949,624 | 4/1976 | Bienert | 74/520 |

FOREIGN PATENT DOCUMENTS 48868  6/1934  Denmark ........................... 74/526

Primary Examiner—Gary L. Smith
Attorney, Agent, or Firm—Wegner, Stellman, McCord, Wiles & Wood

[57] ABSTRACT

A closure operator for a pivotally mounted closure, such as a vehicle sun roof or a pivoted window, having a series of pivotally interconnected links including an opener link pivoted to the closure and to an idler link which is pivotally mounted to a base. A driver link is pivotally connected between the opener link and a handle rotatable on the base whereby handle movement is imparted to the driver link for moving the opener link and the closure and with the movement of the opener link being partly guided by the idler link.

11 Claims, 3 Drawing Figures

U.S. Patent  Jan. 30, 1979  4,136,578
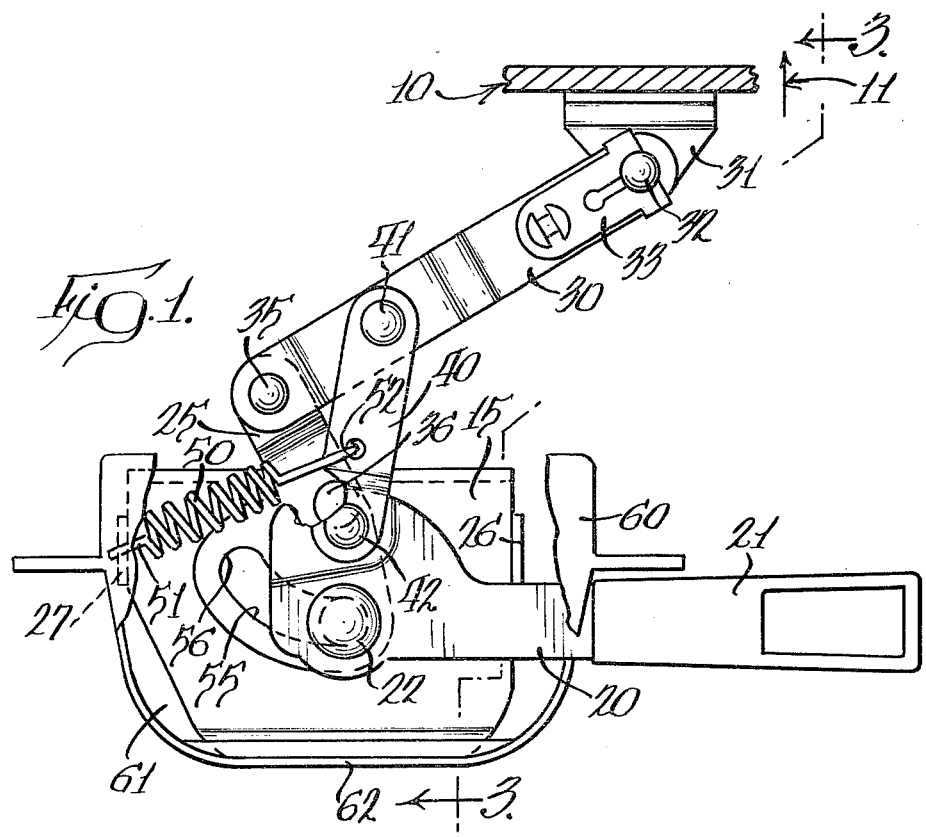
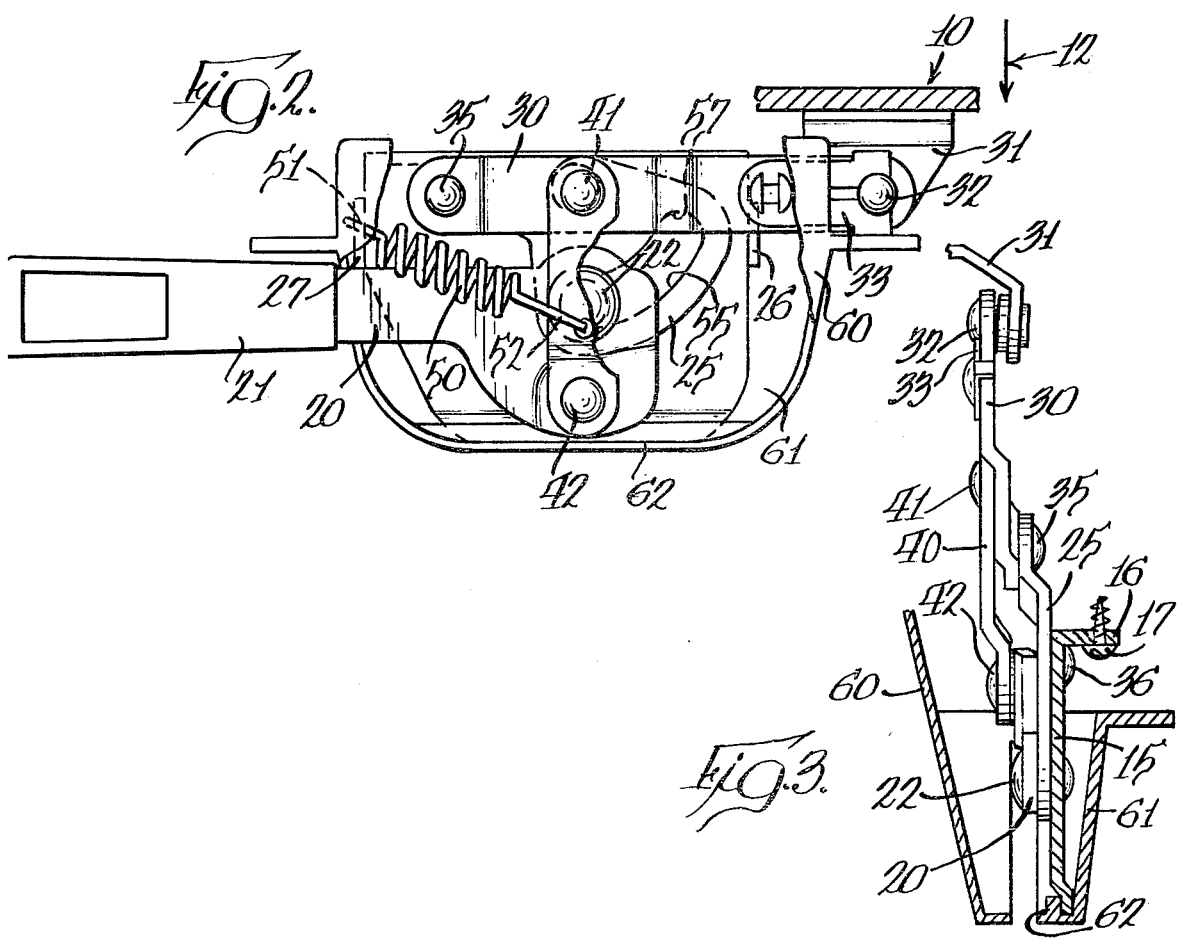

CLOSURE OPERATOR

BACKGROUND OF THE INVENTION

This invention pertains to a new and improved closure operator for moving a closure which is guided for movement in a fixed path between open and closed positions and maintaining the closure in the desired position.

SUMMARY

A primary feature of the invention disclosed herein is to provide a closure operator having linkage structure operable by a handle for moving a closure between open and closed positions and securely holding the closure in either of the positions.

Another feature of the invention is to provide a closure operator having spring means associated with the linkage structure which assists in holding the linkage structure in a pre-set position and which, additionally, smooths out the action of the mechanism and retards closing of the closure when gravity acts on the closure in a closing direction.

In carrying out the foregoing features, a primary object of the invention is to provide a closure operator having a base, an opener link connectable to a closure, an operating handle movable on the base between two positions, an idler link movably mounted on the base and pivotally connected to the opener link adjacent an end thereof to control movement of the opener link relative to the base, and a driver link pivotally connected to both the handle and the opener link to impart handle movement to the opener link with the idler link partly guiding the movement of the opener link.

Additionally, the closure operator has the aforesaid linkage structure related whereby an over-center relation is obtained in both open and closed positions of the linkage structure whereby a force applied to the closure will not cause movement of the linkage structure. The idler link which guides an end of the opener link during movement thereof has a curved slot receiving a pivot means for the handle and with the ends of the curved slot limiting pivotal movement of the idler link to establish a fixed position for an end of the opener link in both open and closed positions and with the idler link being fixed at one limit position providing for a controlled, tight lock-up of the closure in response to movement of the handle. The aforesaid spring means comprises a tension spring connected between the base of the closure operator and the driver link and positioned to yieldably hold the driver link in an over-center position in both open and closed positions of the linkage structure and to exert additional opposing force as the driver link is moved between said positions by operation of the handle.

DESCRIPTION OF THE DRAWINGS

FIG. 1 is a plan view of the closure operator shown connected to a part of a closure and having parts broken away;

FIG. 2 is a view, similar to FIG. 1, showing the closure operator and closure in closed position, with parts broken away; and FIG. 3 is a sectional view, taken generally along the line 3—3 in FIG. 1, and with the closure omitted.

DESCRIPTION OF THE PREFERRED EMBODIMENT

The closure operator is usable primarily for operating a closure having a small degree of opening movement as, for example, an automotive vehicle sun roof. Such a closure is shown broken away at 10 in FIGS. 1 and 2. Such a closure is guided for movement in a fixed path as defined by hinge means (not shown) for the closure which cause the closure to move generally in a straight line and in an opening direction, as indicated generally by the arrow 11, and in a closing direction, as indicated generally by the arrow 12. Proper operation of the closure operator disclosed herein requires the fixed path or essentially straight-line movement of the closure.

The closure operator has a generally planar plate 15 defining a base for the closure operator and having flange elements 16 to receive fasteners 17 for mounting thereof to a support surface.

A handle 20 having a handle grip 21 fitted thereon is pivotally mounted on the base 15 by means of pivot means in the form of a rivet 22 and with an idler link 25 positioned therebetween.

The handle 20 is operable between two limit positions determined by engagement of the handle with a pair of tabs 26 and 27 turned up from the base 15. The open limit position for the handle is shown in FIG. 1 and the closed limit position for the handle is shown in FIG. 2.

An opener link 30 has one end pivotally connected to a closure bracket 31 secured to the closure. A stud 32 on the bracket passes through a hole in the opener link and is captured by a conventional type slidable keeper 33. An opposite end of the opener link 30 is pivotally connected to an end of the idler link 25 by pivot means in the form of a rivet 35. The idler link intermediate its ends is pivotally mounted on the base 15 by pivot means in the form of a rivet 36 whereby pivotal movement of the idler link 25 guides one end of the opener link 30 between the positions shown in FIGS. 1 and 2.

Rotational movement of the handle 20 is translated into movement of the opener link 30 by means of a driver link 40 having a first end pivotally connected to the opener link 30 intermediate its ends by pivot means in the form of a rivet 41 and having a second end pivotally connected to a raised part of the handle 20 offset from the pivot axis of the latter by pivot means in the form of a rivet 42.

Spring means coact with the linkage structure and, as shown, includes a tension spring 50 having an end 51 extended through an opening in the stop tab 27 and having its other end 52 fastened in an opening in the driver link 40.

The idler link 25 has a curved slot 55 near an end thereof which receives the central part of the rivet 22 defining the handle pivot whereby an end 56 of the slot defines a limit for rotation of the idler link 25 in one direction and, thus, the closed position for the idler link as shown in FIG. 2 and the other end 57 of the curved slot defines a limit position for the idler link in the open position of the closure, as seen in FIG. 1.

A decorative case encloses the operator structure and has enclosing parts 60 and 61 with a slot 62 therebetween to permit free movement of the handle 20 between the positions of FIGS. 1 and 2.

With the closure in open position, as shown in FIG. 1, the handle 20 is in a limit position against the stop tab 26 and tension spring 50 is acting in a direction to maintain the driver link 40 in the position shown. Any force applied to the closure 10 in a closing direction or downwardly, as viewed in FIG. 1, will not move the closure, since the linkage structure is in an over-center position. Such a force applied to the driver link 40 through the rivet 41 will exert a force on the rivet 42 interconnecting the driver link and the handle and urge the handle 20 in a counterclockwise direction, with such movement thereof being blocked by the stop tab 26. The idler link will not move because of engagement between slot end 57 and the rivet 22. Additionally, any force applied to the closure 10 urging the closure toward the right, as viewed in FIG. 1, is resisted by the idler link 25 having the slot end 57 positioned against the rivet 22.

Clockwise rotation of the handle 20 from the position of FIG. 1 to the position of FIG. 2 results in a pull on the driver link 40 to exert a pull on the opener link 30 and move the closure 10 to closed position. With the closure being constrained for movement in a fixed path, there is a resulting movement of the opener link 30 toward the left, as viewed in FIG. 2, as permitted by counterclockwise rotation of the idler link 25. The movement of the idler link is stopped by engagement of the end 56 of the curved slot, with the handle-pivoting rivet 22, whereby final movement of the handle against the stop tab 27 provides for a tight lock-up of the closure. Any force applied to the closure 10 tending to open it is prevented by the over-center relation of the linkage and, particularly, the relation of the two pivot connections 41 and 42 of the driver link 40 to the opener link 30 and the handle 20 to the pivot axis for the handle defined by the rivet 22. As seen in FIG. 2, an upward force applied to the opener link 30 reacts on the handle 20 in a direction attempting to cause clockwise pivoting thereof and this is prevented by the handle being engaged against the stop tab 27. The idler link 25 is blocked against counterclockwise rotation. The tension spring 50 assists in maintaining this relation.

Additionally, the tension spring 50 smooths out the action of the mechanism and assists in a controlled closing action. As the linkage structure moves from the position of FIG. 1 to the position of FIG. 2, the driver link 40 moves in a direction to stretch the tension spring 50 and the resistance imposed by the spring acts to oppose downward free fall of the closure.

I claim:

1. A closure operator having a base, an opener link connectable to a closure, an operating handle movable on said base between two positions, an idler link movably mounted on said base and pivotally connected to said opener link adjacent an end thereof to control movement of the opener link relative to the base, and a driver link extending between said handle and opener link and being pivotally connected to each of said handle and opener link to impart handle movement to the opener link with the idler link guiding the movement of the opener link.

2. A closure operator as defined in claim 1 wherein said idler link is pivotally mounted on said base for pivotal movement about a pivot axis fixed relative to the base, a curved slot in said idler link, guide means on said base positioned in said curved slot whereby the ends of said curved slot define limits of movement of said idler link.

3. A closure operator as defined in claim 1 including spring means resisting movement of said links.

4. A closure operator as defined in claim 3 wherein said spring means includes a tension spring connected between said base and the driver link.

5. A closure operator as defined in claim 1 wherein said handle is pivotally mounted for movement to said two positions providing for open and closed positions for the closure, and said links and handle pivot being related to have an over-center relation in both handle positions to prevent movement of the closure other than by the handle.

6. A closure operator as defined in claim 5 wherein said base has means positioned to prevent movement of the handle beyond said two positions.

7. A closure operator for a closure guided for movement in a fixed path comprising, a base, a handle pivotally mounted by pivot means on the base for rotation between two limit positions providing for closed and open positions of the closure, an idler link pivotally mounted on the base intermediate first and second link ends and having a curved slot at said first end receiving the handle pivot means, an opener link pivotally connectable at one end to said closure and at the other end pivotally connected to the second end of the idler link, a driver link having first and second ends with the first end pivotally connected to said handle and the second end pivotally connected to said opener link intermediate the ends of the opener link whereby movement of the handle causes the driver link to move the opener link and the idler link, said curved slot having opposite ends engageable with said handle pivot means to limit movement of the idler link.

8. A closure operator as defined in claim 7 wherein the base has stop means to limit travel of the handle, and the pivot connection of the driver link to said opener link is over-center with respect to the handle pivot means and the pivot connection of the driver link to the handle when the closure is open whereby a closing force applied to the closure is resisted by said handle engaged against said stop means.

9. A closure operator as defined in claim 8 wherein the pivot connections of the driver link to the opener link and the handle are over-center with respect to the handle pivot means when the closure is closed whereby an opening force applied to the closure is resisted by said handle engaged against said stop means.

10. A closure operator as defined in claim 9 including a tension spring connected between said base and the driver link and operative to yieldably hold the operator in either of said over-center positions and to exert an increasing force opposing movement of the driver link when said closure is moved from open position to retard free movement of the closure.

11. A closure operator for a closure guided for movement in a fixed path comprising, a base, a handle movably mounted on the base for movement between two positions corresponding to open and closed positions of the closure, an idler link pivotally mounted on the base intermediate the ends thereof and having a slot for receiving pin means carried by said base, an opener link pivotally connected to one end of the idler link and having one end pivotally connectable to said closure, a driver link having first and second ends with its first end pivotally secured to said handle and its second end pivotally secured to said opener link intermediate the ends of the opener link remote from the idler link connection, whereby movement of the handle causes the driver link to move the opener link and the idler link, said slot having opposite ends engageable with said pin means to limit movement of the idler link.

* * * * *